(12) United States Patent
Yu et al.

(10) Patent No.: US 8,308,392 B2
(45) Date of Patent: Nov. 13, 2012

(54) BALL JOINT

(76) Inventors: David Chen Yu, Laguna Niguel, CA (US); Michael David Yu, Laguna Niguel, CA (US)

( * ) Notice: Subject to any disclaimer, the term of this patent is extended or adjusted under 35 U.S.C. 154(b) by 0 days.

(21) Appl. No.: 12/797,553

(22) Filed: Jun. 9, 2010

(65) Prior Publication Data

US 2011/0305504 A1    Dec. 15, 2011

(51) Int. Cl.
F16C 11/06 (2006.01)
(52) U.S. Cl. .................... 403/129; 403/144
(58) Field of Classification Search ............ 403/74, 403/76, 77, 90, 120, 122, 128, 129, 131, 403/144–146, 136, 220
See application file for complete search history.

(56) References Cited

U.S. PATENT DOCUMENTS

| | | | | |
|---|---|---|---|---|
| 673,541 A * | 5/1901 | Hussey | ............................ | 403/73 |
| 921,833 A * | 5/1909 | Hespe et al. | .................. | 285/185 |
| 1,434,631 A * | 11/1922 | Reynolds | ....................... | 285/266 |
| 1,596,889 A * | 8/1926 | Pfeifer | ............................. | 403/74 |
| 1,672,605 A * | 6/1928 | Dobrick | .......................... | 248/56 |
| 1,933,909 A * | 11/1933 | Huddle | ......................... | 403/129 |
| 2,545,406 A * | 3/1951 | Friend | ........................... | 403/129 |
| 2,631,048 A * | 3/1953 | Palmer | ............................ | 285/95 |
| 3,319,982 A * | 5/1967 | Schwartz | ........................ | 403/90 |
| 3,341,230 A * | 9/1967 | Wichers | ........................ | 285/266 |
| 5,484,211 A * | 1/1996 | Uthoff | ........................... | 384/192 |
| 7,674,063 B2 * | 3/2010 | Jan et al. | ........................ | 403/145 |
| 2008/0031683 A1 * | 2/2008 | Chao | .............................. | 403/122 |

* cited by examiner

Primary Examiner — Joshua Kennedy

(57) ABSTRACT

A friction ball joint and a method for using the friction ball joint are provided. A clam shell is formed from at least two segments and has a mechanical element extending from one of the clam shell segments. A cap that has a mechanical element extending from the rounded portion of the cap is also provided. This cap covers the joined clam shell segments opposite the mechanical element extending from the clam shell. The clam shell surrounds a spring that pushes the cap against the fixed outer clam shell, creating friction that retains the friction ball joint in the desired position. Further embodiments provide a locking assembly and an external spring or clamp. In these embodiments the spring or clamp is placed over the outside of the ball and clam shell. The ball has holes disposed over its surface to receive a locking assembly to hold the ball joint in the selected position.

12 Claims, 6 Drawing Sheets

Fig. 1A
Fig. 1B
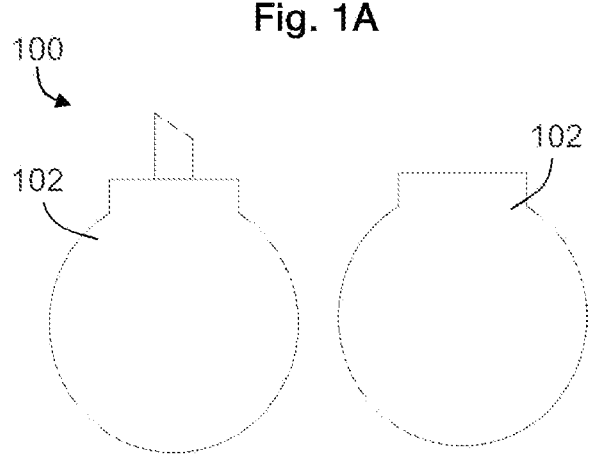
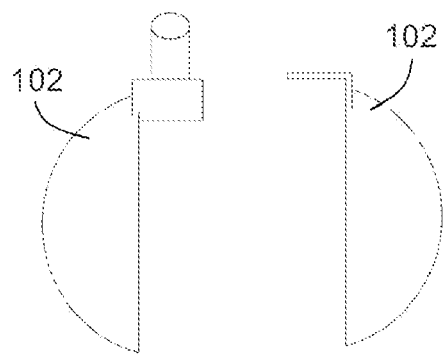
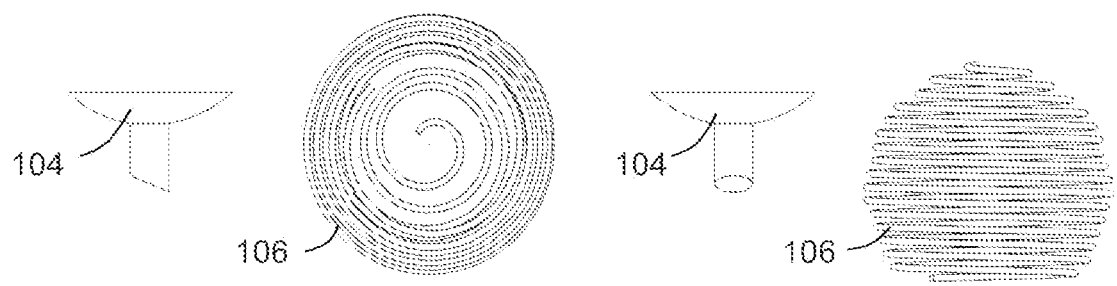
Fig. 1C
Fig. 1D
Fig. 1E
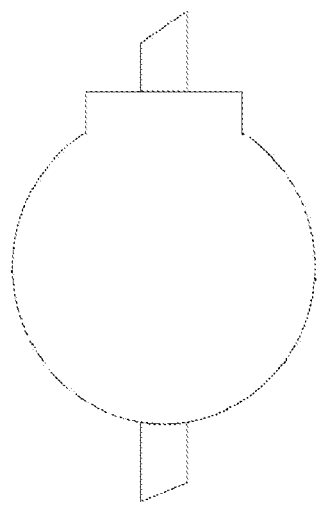
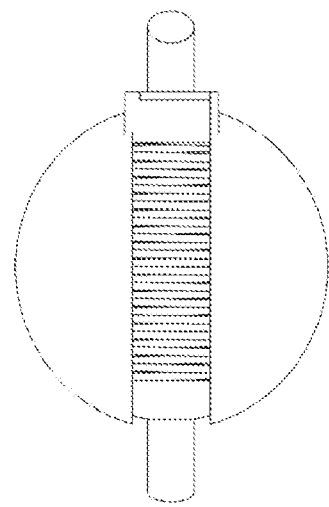
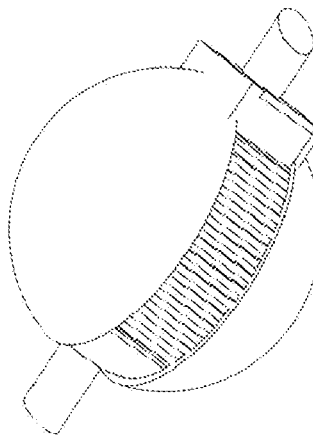

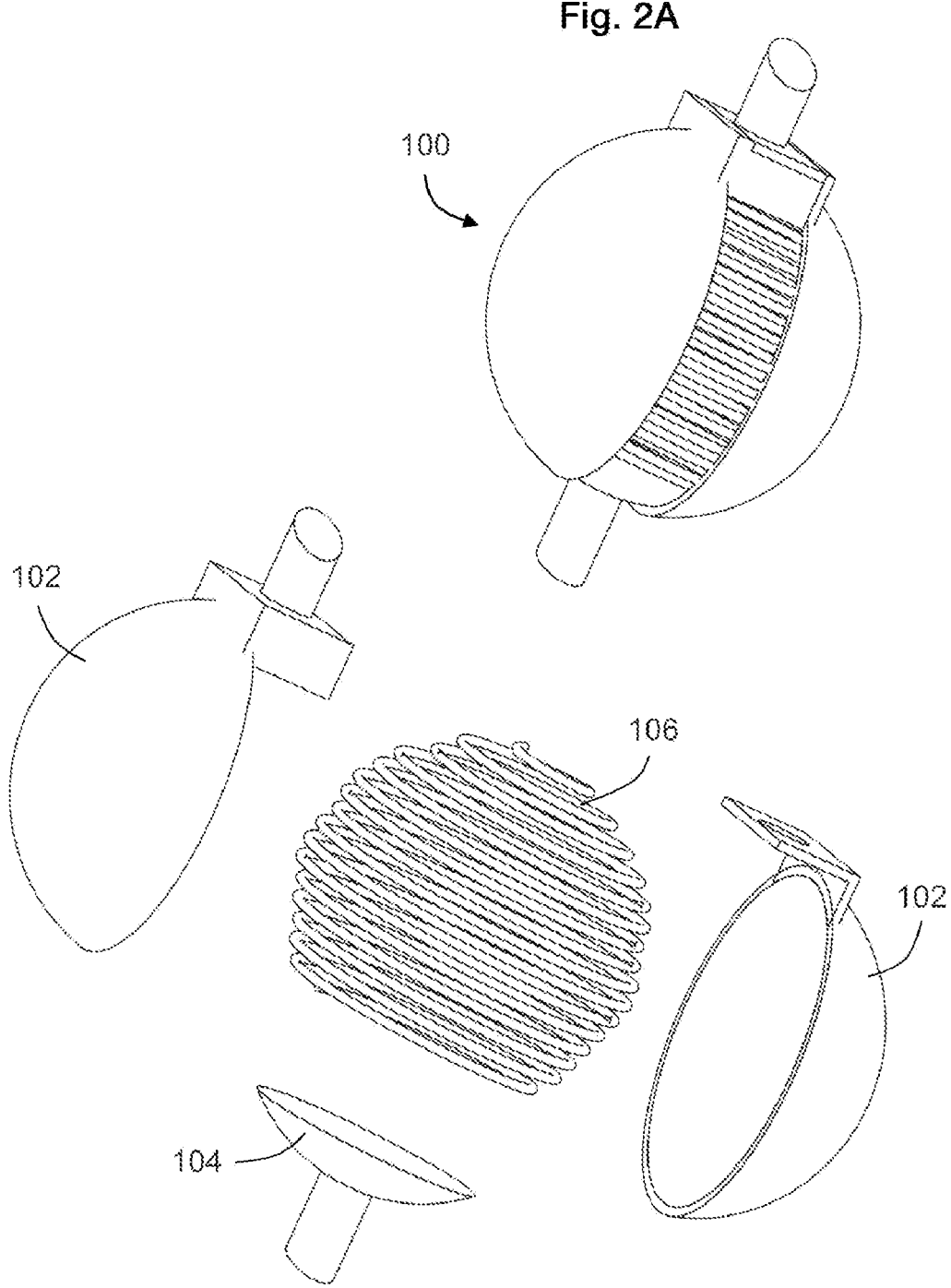

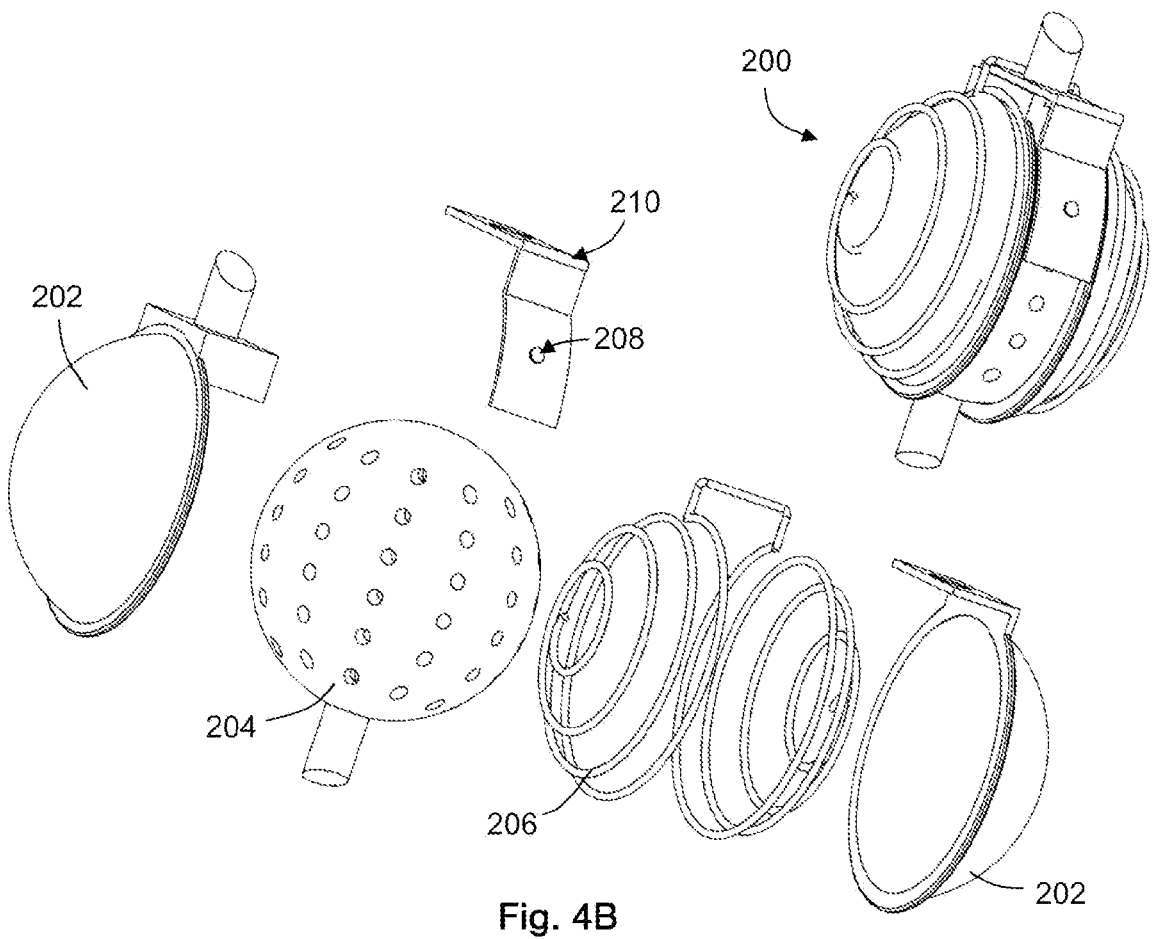

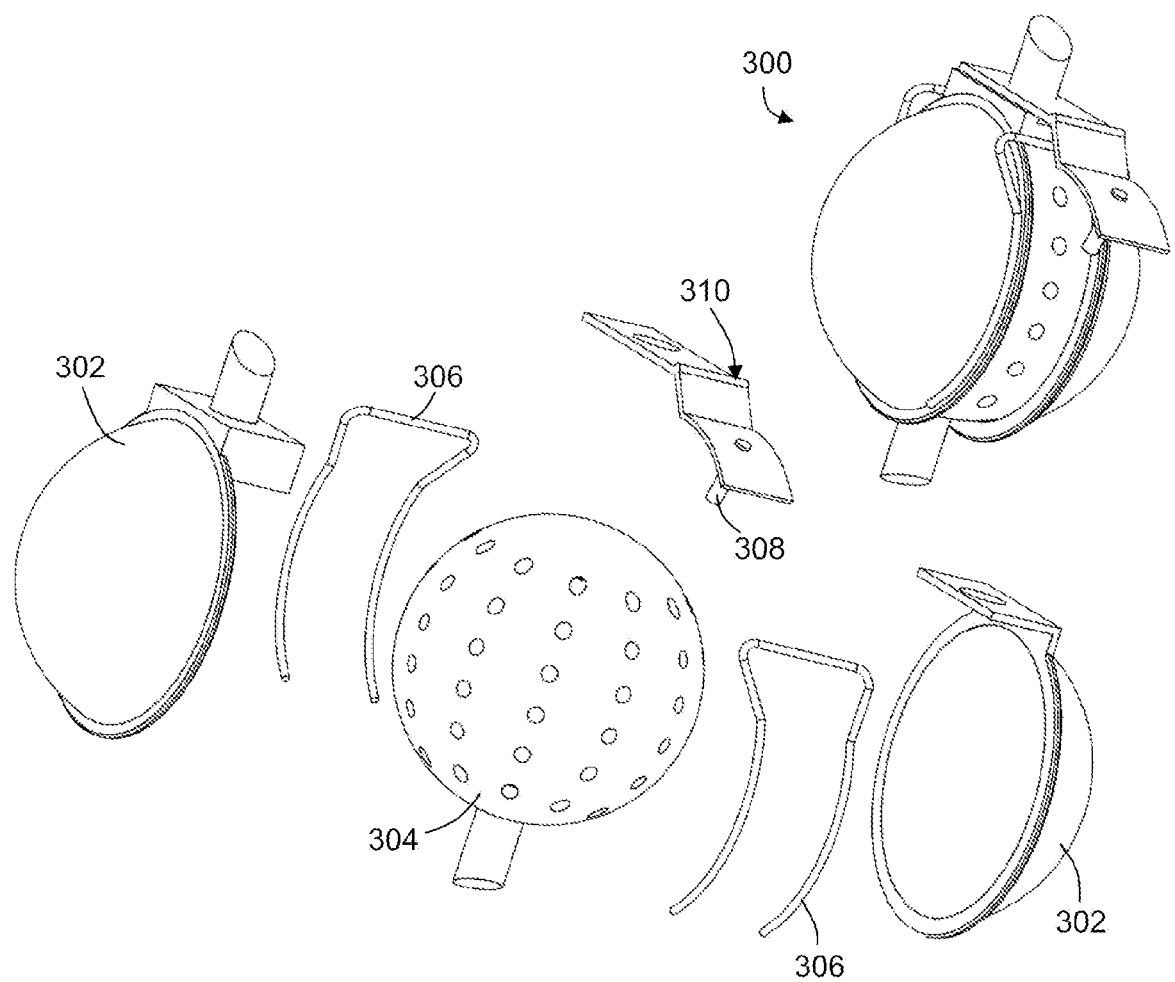

BALL JOINT

BACKGROUND

1. Field

The present disclosure relates generally to ball joints and their use, and, in particular, to an apparatus and method for a ball joint, a friction ball joint, and a locking ball joint.

2. Background

Ball joints are used in a variety of applications including automotive, medical, and mechanical designs. Typically, ball joints are used in applications or designs where rotational motion is desired. In automotive applications ball joints serve as pivots between the wheels and the automobile's suspension. There, ball joints can act to improve control, stability and tire wear.

Ball joints are found in most linkage systems for motion control applications because they allow rotation in the x, y, and z directions, depending on the design of the ball joint. Motion control ball joints are retained with an internal spring and are examples of the type of ball joints found in linkage systems. Traditional ball joints have a receptacle to hold the ball in place. The ball moves within the receptacle, providing motion in the directions desired. There is an opening in the receptacle to provide interconnection with the device whose motion is to be controlled and directed. This opening in the receptacle limits the amount of vertical rotation possible by the ball's shaft. Horizontal motion is not limited.

Traditional ball joints have not provided a locking mechanism to hold the ball joint in a desired position. Additionally, most ball joints rotate freely. This free movement means that little force is needed to move the ball joint out of a desired position. A frictional ball joint would require a specific amount of force to be applied before movement occurs.

There is a need in the art for an improved ball joint offering more vertical movement and for a ball joint providing a locking mechanism. In addition, there is a need for a friction ball joint.

SUMMARY

The ball joint of an embodiment provides for a friction ball joint. The friction ball joint is formed from a clam shell ball, which is generally formed in two segments. A first mechanical element extends from the clam shell ball. A cap, also having an attached mechanical element, is placed over the clam shell forming a ball. A second mechanical element extending from the clam shell ball is opposite the first mechanical element. A spring is disposed within the clam shell ball.

A further embodiment provides for a friction ball joint incorporating an outside spring with a locking pin. The friction ball joint is comprised of a clam shell ball formed from at least two segments. A mechanical element extends from the clam shell ball and an opening is formed in the clam shell ball opposite the mechanical element. Placed within the clam shell ball is a ball having holes over its surface. A second mechanical element extends from this ball with holes, with the second mechanical element extending opposite the mechanical element on the clam shell ball. A hinge having a locking pin is fitted over the mechanical element extending from the clam shell ball. A spring is disposed over the clam shell ball. This spring is shaped to allow the holes in the ball to receive the locking pin.

Yet a further embodiment provides a friction ball joint using at least two clamps and locking pin. A clam shell ball formed from at least two segments has a mechanical element extending from the clam shell ball and an opening in the clam shell ball opposite the mechanical element extending from the clam shell ball. Placed within the clam shell ball is a ball having holes sized to receive a locking pin, the holes disposed over the surface of the ball. A mechanical element extends from the ball having holes over its surface. When assembled the two mechanical elements are opposite one another. A hinge attached to a locking pin is placed over the mechanical element on the clam shell ball. A clamp is placed over the clam shell ball to retain the friction ball joint in assembled condition.

A further embodiment provides a method of using a ball joint, comprising the steps of attaching a first mechanical element extending from a ball joint to an object, and then attaching a second mechanical element extending from a ball joint to a second object. The object to be placed in a desired position is moved into position by moving at least one mechanical element of the ball joint. Friction within the ball joint maintains the desired position.

Various aspects and embodiments of the invention are described in further detail below.

BRIEF DESCRIPTION OF THE DRAWINGS

FIGS. 1A-1E are illustrations of a friction ball joint incorporating an internal spring, in accordance with various embodiments of the present invention.

FIGS. 2A-2B are perspective views of the friction ball joint incorporating an internal spring depicted in FIGS. 1A-1E.

FIGS. 4A-4B are perspective views of the friction ball joint incorporating an external spring and a locking mechanism depicted in FIGS. 3A-3E.

FIGS. 6A-6B are perspective views of the friction ball joint incorporating clips and a locking pin depicted in FIGS. 5A-5E.

DETAILED DESCRIPTION

Figure 3A:
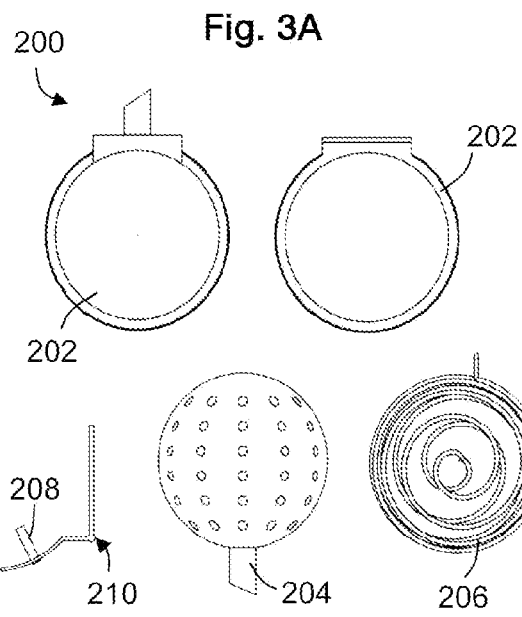
FIGS. 3A-3E are illustrations of a friction ball joint incorporating an external spring and a locking mechanism, in accordance with one or more embodiments the present invention.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Referring to FIGS. 1A-1E and FIGS. 2A-2B, a friction ball joint 100, incorporating an internal spring is depicted. The friction ball joint 100 is formed by the clam shell 102, which consists of two pieces that fit together to retain a spring 106. A cap 104 provides a shaft or other mechanical element for attaching the friction ball joint to another mechanical element. The friction ball joint is not limited to a shaft attachment, rather the friction ball joint may be attached to any surface or connection to an opposite moving component of an assembly or other mechanical element. FIGS. 1A-1B provides unassembled views of the friction ball joint from both top and side view perspectives.

FIGS. 1C-1E also provides top, side, and angled views of an assembled friction ball joint according to an embodiment. The side view shows the configuration of the spring 106 in the assembled friction ball joint. The spring 106 pushes the cap 104 against the fixed outer clam shell 102. This pressure creates friction, enabling the ball joint to be placed in a desired position and remain there until force sufficient to overcome the friction is applied. The angled view illustrates the range of motion provided by the friction ball joint. The amount of friction created by the spring dictates the amount of force required to move the shaft extending from the ball from the original position. The springs or clamps should be selected to provide the desired amount of inertia.

Figure 3B:
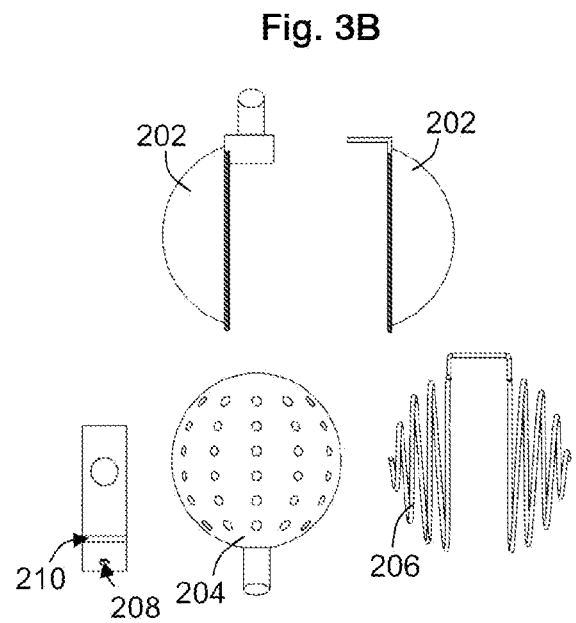

FIGS. 3A-3E and FIGS. 4A-4B illustrates a friction ball joint incorporating an outside spring and a locking pin, according to a further embodiment. The friction ball joint and locking pin assembly 200 is constructed of the components as described below. The clam shell 202 provides the shell of the friction ball joint. Clam shell 202 is formed from two interlocking pieces of suitable material. The ball 204 has a quantity of holes covering the surface of the ball. A locking pin 208 is provided as shown in FIGS. 3A-3B In use, the ball 204 rotates into the desired position and the locking pin 208 enters one of the holes on the surface of ball 204. A hinge 210 is attached to the outer surface of clam shell 202 and allows for locking pin 208 to be moved into and out of the locking position. Spring 206 is positioned on the outside of the friction ball joint and provides the force to push the clam shell 202 toward the ball 204. FIG. 4A depicts this in the assembled side view.

Figure 3C:
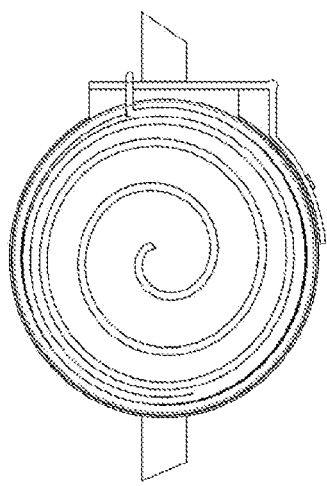
Figure 3D:
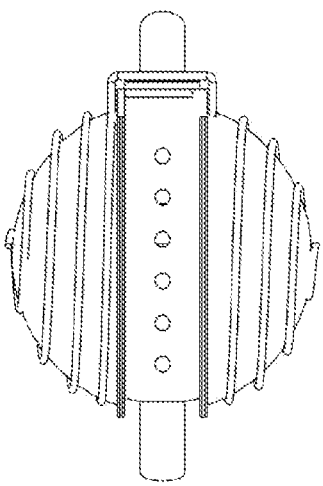
Figure 3E:
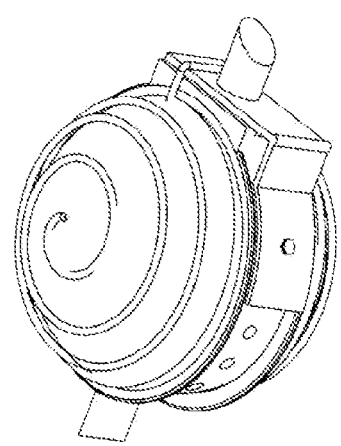

In operation, the friction ball joint with locking pin 200 is first moved into the desired position. Once in position, the locking pin 208 is pushed down into one of the holes in ball 204, locking the ball joint in the selected position. FIGS. 3C-3E illustrates this action in the top, and angled views of the friction ball joint.

FIGS. 5A-5E and FIGS. 6A-6B illustrates a further embodiment of a friction ball joint using clips and a locking pin. The friction ball joint using clips and a locking pin assembly 300 are formed from a clam shell 302. This clam shell 302 is similar to the clam shell designs described above. The ball 304 incorporates a number of holes covering the surface of the ball. The clam shell is held closed by clamps 306. Locking pin 308 is attached to hinge 310.

Figure 5A:
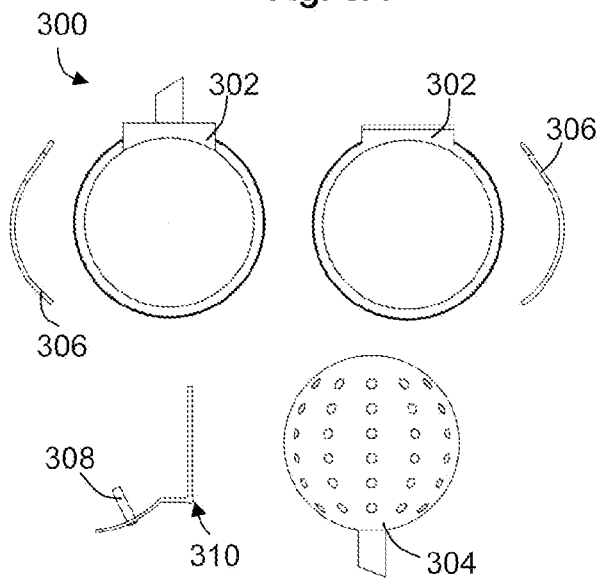
FIGS. 5A-5E are illustrations of a friction ball joint incorporating clips and a locking pin, according to one or more embodiments of the present invention.
Figure 5B:
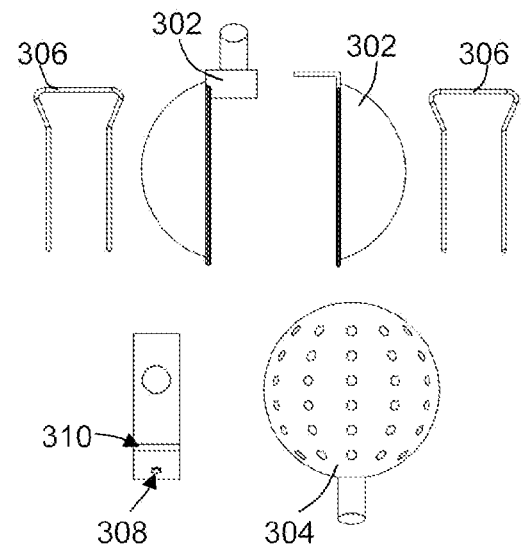
Figure 5C:
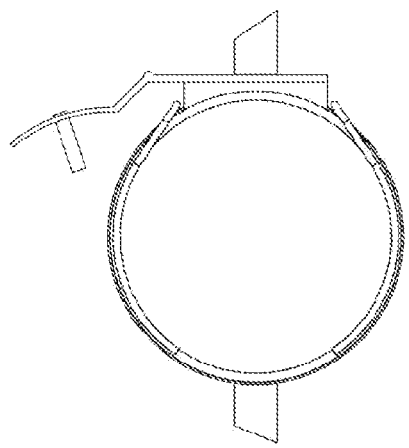
Figure 5D:
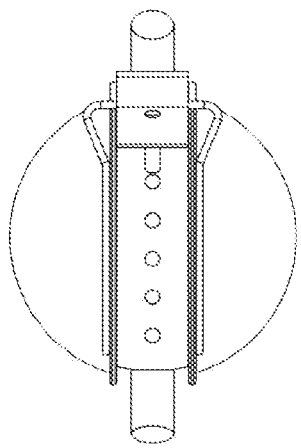
Figure 5E:
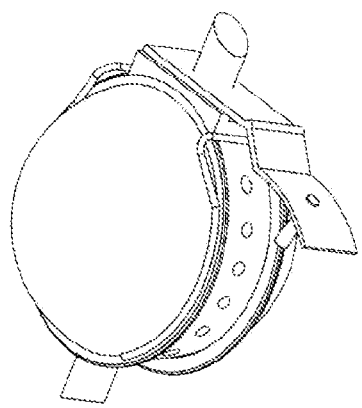

In use the friction ball joint assembly 300 is described with reference to the assembled view drawings found in FIGS. 5A-5E and FIGS. 6A-6B. The top view illustrates the hinge 310 and locking pin 308 and depicts how the pin is moved away from the surface of the ball before the friction ball joint is moved to the desired position. The side view of FIG. 5D shows the holes in ball 304 with the locking pin 308 poised above the holes. The clamps 306 on the outside of the assembly 300 push the clam shell 302 pieces inward on to the ball. The pressure created by the clamps causes friction, which limits the rotational motion and holds the ball 304 and clam shell 302 in the desired position. When the desired position is attained, the locking pin 308 is pushed into the hole in ball 304.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features diklosed herein.

The invention claimed is:

1. A friction ball joint, comprising:
   a clam shell ball formed from at least two segments, having a mechanical element extending from the clam shell ball;
   a cap having a mechanical element extending from a rounded portion of the cap, attached to a side of the clam shell ball opposite the mechanical element extending from the side of the clam shell ball, the mechanical elements defining an axis; and
   a spring having a generally spherical overall cross sectional shape contained within the clam shell ball adjacent the inside surface thereof, and having a central vertical axis about which the spring extends being the same as the axis defined by the mechanical elements of the clam shell ball and the cap.

2. The ball joint of claim 1, wherein the spring pushes the cap against an outer clam shell.

3. The ball joint of claim 1, wherein pressure from the spring creates friction to place the ball joint in a desired position and remain there until application of a force sufficient to overcome the friction.

4. The ball joint of claim 1, wherein friction created by the spring determines an amount of force required to move the mechanical element extending from the ball from the original position.

5. The ball joint of claim 1, wherein the mechanical element of the cap is a shaft for attaching the friction ball joint to another mechanical element.

6. The ball joint of claim 1, wherein the clam shell ball segments fit together to retain the spring.

7. The ball joint of claim 1, wherein the cap is attached to a surface or connection to an opposite moving component of an assembly.

8. A method for forming a friction ball joint, comprising:
   forming a clam shell ball from at least two segments, having a mechanical element extending from the clam shell ball;
   covering the clam shell ball with a cap having a mechanical element extending from a rounded portion of the cap;
   attaching the cap to a side of the clam shell ball opposite the mechanical element extending from the side of the clam shell ball; and
   providing a spring contained within the clam shell ball, wherein the spring comprises a helical shape inside of the clam shell ball and wherein the cap has a mechanical element extending from a rounded portion of the cap, attached to a side of the clam shell ball opposite the mechanical element extending from the side of the clam shell ball, the mechanical elements defining an axis; and a spring having a generally spherical overall cross sectional shape contained within the clam shell ball adjacent the inside surface thereof, and having a central vertical axis about which the spring extends being the same as the axis defined by the mechanical elements of the clam shell ball and the cap.

9. The method of claim 8, wherein the spring pushes the cap against a fixed outer clam shell.

10. The method of claim 8, comprising applying spring pressure create friction, enabling the ball joint to be placed in a desired position and remain there until force sufficient to overcome the friction is applied.

11. The method of claim 8, wherein the amount of friction created by the spring dictates the amount of force required to move the shaft extending from the ball from the original position.

12. The method of claim 8, comprising selecting the spring or clamp to provide a desired amount of inertia.

* * * * *